United States Patent
Ohara et al.

(10) Patent No.: US 11,987,036 B2
(45) Date of Patent: May 21, 2024

(54) SEPARATION/RECOVERY METHOD FOR LAMINATED FILM

(71) Applicant: DIC Corporation, Tokyo (JP)

(72) Inventors: Shin-ichi Ohara, Tokyo (JP); Yutaka Hamasuna, Tokyo (JP); Hideoki Iwanami, Tokyo (JP); Hideyasu Teramoto, Tokyo (JP); Takashi Tamaoka, Tokyo (JP); Yoshitomo Nagata, Tokyo (JP); Yasuhiro Sente, Tokyo (JP)

(73) Assignee: DIC CORPORATION, Tokyo (JP)

( * ) Notice: Subject to any disclaimer, the term of this patent is extended or adjusted under 35 U.S.C. 154(b) by 194 days.

(21) Appl. No.: 17/270,560

(22) PCT Filed: Sep. 12, 2019

(86) PCT No.: PCT/JP2019/035856
§ 371 (c)(1),
(2) Date: Feb. 23, 2021

(87) PCT Pub. No.: WO2020/066652
PCT Pub. Date: Apr. 2, 2020

(65) Prior Publication Data
US 2021/0178744 A1 Jun. 17, 2021

(30) Foreign Application Priority Data
Sep. 25, 2018 (JP) .................. 2018-178786

(51) Int. Cl.
B32B 43/00 (2006.01)
C08J 11/16 (2006.01)

(52) U.S. Cl.
CPC ............ B32B 43/006 (2013.01); C08J 11/16 (2013.01); C08J 2367/02 (2013.01); Y10T 156/1111 (2015.01); Y10T 156/1116 (2015.01); Y10T 156/1121 (2015.01); Y10T 156/1153 (2015.01); Y10T 156/1911 (2015.01); Y10T 156/1922 (2015.01)

(58) Field of Classification Search
CPC ............ B32B 43/006; Y10T 156/1111; Y10T 156/1116; Y10T 156/1121; Y10T 156/1153; Y10T 156/1911; Y10T 156/1922
See application file for complete search history.

(56) References Cited

U.S. PATENT DOCUMENTS

| | | |
|---|---|---|
| 4,629,780 A | 12/1986 | Schoenhard |
| 4,765,835 A | 8/1988 | Schoenhard |
| 5,096,980 A | 3/1992 | Yamazaki et al. |
| 5,202,391 A | 4/1993 | Yamazaki et al. |
| 5,368,949 A | 11/1994 | Ushimaru et al. |
| 2005/0131162 A1 † | 6/2005 | Tanaka |
| 2006/0178442 A1 | 8/2006 | Lee et al. |
| 2009/0304561 A1 | 12/2009 | Lee |
| 2020/0172651 A1 | 6/2020 | Saitou et al. |

FOREIGN PATENT DOCUMENTS

| | | |
|---|---|---|
| EP | 1561774 A1 | 8/2005 |
| EP | 1683829 A1 | 7/2006 |
| JP | 47-34572 A | 11/1972 |
| JP | 50-63079 A | 5/1975 |
| JP | 50-95376 A | 7/1975 |
| JP | S52-138131 A | 11/1977 |
| JP | 62-109837 A | 5/1987 |
| JP | 2-84482 A | 3/1990 |
| JP | 5-179222 A | 7/1993 |
| JP | H08-305265 A | 11/1996 |
| JP | H08305265 A † | 11/1996 |
| JP | 2001-261746 A | 9/2001 |
| JP | 2001261746 A † | 9/2001 |
| JP | 2001-335771 A | 12/2001 |
| JP | 2002-96327 A | 4/2002 |
| JP | 2003-192827 A | 7/2003 |
| JP | 2006-110531 A | 4/2006 |
| JP | 2006-205160 A | 8/2006 |
| JP | 2007-160243 A | 6/2007 |
| JP | 2010-525963 A | 7/2010 |
| JP | 2012-184283 A | 9/2012 |
| JP | 2014-19003 A | 2/2014 |
| JP | 2014019003 A † | 2/2014 |
| JP | 2017-080902 A | 5/2017 |
| JP | 2017080902 A † | 5/2017 |
| WO | 2014/208432 A1 | 12/2014 |
| WO | 2019/017133 A1 | 1/2019 |

OTHER PUBLICATIONS

Minaru ea. JP2001-261746A specification translation (Year: 2001).*
International Search Report dated Nov. 19, 2019, issued in counterpart International Application No. PCT/JP2019/035856, w/English translation (7 pages).
Written Opinion in Japanese dated Nov. 19, 2019, issued in counterpart International Application No. PCT/JP2019/035856 (7 pages).
The Extended European Search Report dated May 23, 2022, issued in counterpart EP Application No. 19865955.9. (6 pages).
Third Party Observation dated Dec. 17, 2021, issued in counterpart EP Application No. 19865955.9. (5 pages).
Third Party Observation dated Mar. 30, 2023, issued in counterpart EP Application No. 19865955.9. (4 pages).

* cited by examiner
† cited by third party

Primary Examiner — Philip C Tucker
Assistant Examiner — Nickolas R Harm
(74) Attorney, Agent, or Firm — WHDA, LLP

(57) ABSTRACT

A method for separating and recovering a layered film laminated and adhered with a reactive adhesive, the method including a step 1 of immersing the layered film in an alkaline solution while stirring the layered film with heating at 20° C. to 90° C. or ultrasonically vibrating the layered film and a step 2 of recovering separated single-layered films that constitute the respective layers of the layered film. The reactive adhesive is preferably a reactive adhesive containing a polyisocyanate composition and a polyol composition and more preferably a reactive adhesive containing a polyisocyanate composition, a polyol composition, and a compound having an acidic group.

3 Claims, No Drawings

SEPARATION/RECOVERY METHOD FOR LAMINATED FILM

TECHNICAL FIELD

The present invention relates to a method for recycling a resin film laminated by a laminating method using a thermoset reactive adhesive.

BACKGROUND ART

In recent years, the recycling of plastic container packaging has been made obligatory, and thus plastic waste including plastic waste for food packaging has been recovered, classified, and reused.

There are a variety of types of plastic waste, and examples thereof include a lot of plastic waste made of a synthetic resin such as polyethylene, polypropylene, polystyrene (foamed polystyrene), polyethylene terephthalate, or polyvinyl chloride and a number of layered films obtained by laminating films of the synthetic resin or metal foils such as aluminum foils and indicating a product name or the like or imparting decorativeness with printing ink. This plastic waste is in a mixed state during trash collection.

As the layered films, a layered film obtained by laminating a plurality of layers of films made of different types of thermoplastic resins using a plurality of extruders is known, and a device for separating the layered film into single-layered films that constitute the respective layers of the layered film has also been developed (for example, refer to Patent Literature 1).

Meanwhile, in a layered film obtained by laminating a plurality of resin films not by extrusion molding but by a laminating method using a thermoset reactive adhesive that functions by the reaction between an isocyanate compound and a polyol compound, since an adhesive layer formed after the reaction crosslinks the resin films, the lamination adhesive force is strong, and the layered film is used as, for example, a retort food packaging material requiring retort resistance or the like (refer to, for example, Patent Literature 2). Meanwhile, since the adhesive layer formed after the reaction forms a strong crosslinking layer, it is not possible to easily separate the layered film with the separation device as disclosed in Patent Literature 1.

Typically, for wasted plastic in which a thermoplastic resin and a thermosetting resin are present in a mixed form, a method for separating and recycling the wasted plastic using specific gravity is known, but the easiness of the recovery of the wasted plastic varies with the resins. Particularly, in the recycling of thermosetting resins, thermal decomposition is difficult, and thus it is commonly recognized that thermosetting resins are difficult to recycle.

In addition, for layered films on which a product name or the like has been indicated or decorativeness has been imparted with printing ink, there is a case where it is not possible to completely separate the printing ink in a recycling process and a remanufactured product that has been recycled and recovered is colored or has a printed pattern remaining thereon.

As a method for treating such complex waste and classifying and recovering individual components, Patent Literature 3 discloses a method for separating and recovering a plastic-based complex waste, the method including a step of using triethylene glycol as a separation solvent, adding an alkali metal hydroxide as a catalyst, and heating triethylene glycol to 250° C. to 280° C., which is close to the boiling point of 200° C. or higher, to melt a component P1 that is meltable in triethylene glycol, a step of dissolving or depolymerizing a component P2 that is difficult to thermally melt in the triethylene glycol heated to 250° C. to 280° C. under stirring to discharge the component P2 together with a solvent, a step of recovering the remaining meltable component P1 and a reinforced fiber F or a metal component M, and a step of recovering the non-melted component P2 and the separation solvent, distilling the separation solvent under reduced pressure to separate the separation solvent from the non-melted component P2, purifying and reusing the non-melted component P2.

CITATION LIST

Patent Literature

PTL 1: JP-A-2002-96327
PTL 2: JP-A-2001-335771
PTL 3: JP-A-2006-110531

SUMMARY OF INVENTION

Technical Problem

A problem to be solved by the invention is to provide a method for separating and recovering a layered film, the method capable of easily separating a layered film that is present in plastic-based complex waste together with other substances and is laminated and adhered with a reactive adhesive into single-layered films.

Solution to Problem

That is, the present invention is a method for separating and recovering a layered film laminated and adhered with a reactive adhesive, the method including a step 1 of immersing the layered film in an alkaline solution while stirring the layered film with heating at 20° C. to 90° C. or ultrasonically vibrating the layered film and a step 2 of recovering separated single-layered films that constitute the respective layers of the layered film.

In addition, the present invention provides the method for separating and recovering a layered film, in which the reactive adhesive is a reactive adhesive containing a polyisocyanate composition and a polyol composition.

In addition, the present invention provides the method for separating and recovering a layered film, in which the reactive adhesive is a reactive adhesive containing a polyisocyanate composition, a polyol composition, and a compound having an acidic group.

In addition, the present invention provides the method for separating and recovering a layered film, in which the layered film has a printing ink layer and/or a primer layer.

In addition, the present invention provides the method for separating and recovering a layered film, in which the layered film has the reactive adhesive, an ink layer and/or a primer layer, and at least one layer of the reactive adhesive, the ink layer, and the primer layer contains a compound having an acidic group.

Advantageous Effects of Invention

According to the present invention, it is possible to easily separate a layered film that is present in plastic-based complex waste together with other substances and is laminated and adhered with a reactive adhesive into single-layered films and to more easily recover, classify, and reuse plastic-based complex waste in which a layered film laminated and adhered with an unreactive adhesive, for example, a thermoplastic resin adhesive, a layered film obtained by hot-melting films by an extrusion lamination method, or the like is present together with other substances.

DESCRIPTION OF EMBODIMENTS

A method for separating and recovering a layered film of the present invention is a method for separating and recovering a layered film laminated and adhered with a reactive adhesive, the method including a step 1 of immersing the layered film in an alkaline solution while stirring the layered film with heating at 20° C. to 90° C. or ultrasonically vibrating the layered film and a step 2 of recovering separated single-layered films that constitute the respective layers of the layered film.

(Step 1)

The alkaline solution that is used in the step 1 of the separation and recovery method of the present invention is preferably an aqueous solution of sodium hydroxide or an aqueous solution of potassium hydroxide. The aqueous solution of sodium hydroxide or the aqueous solution of potassium hydroxide is preferably an aqueous solution having a concentration of 0.5% by mass to 10% by mass and more preferably an aqueous solution having a concentration of 1% by mass to 5% by mass. In addition, the pH is preferably 10 or more.

In addition, the alkaline solution may further contain a water-soluble organic solvent. As the water-soluble organic solvent, for example, methyl alcohol, ethyl alcohol, propyl alcohol, isopropyl alcohol, ethylene glycol monomethyl ether (methyl cellosolve), ethylene glycol monoethyl ether (cellosolve), ethylene glycol monobutyl ether (butyl cellosolve), ethylene glycoldibutyl ether, diethylene glycol monomethyl ether (methyl carbitol), diethylene glycol dimethyl ether, diethylene glycol monoethyl ether (carbitol), diethylene glycol diethyl ether (diethyl carbitol), diethylene glycol monobutyl ether (butyl carbitol), diethylene glycol dibutyl ether, triethylene glycol monomethyl ether, triethylene glycol dimethyl ether, tetraethylene glycol dimethyl ether, methylene dimethyl ether (methylal), propylene glycol monobutyl ether, tetrahydrofuran, acetone, diacetone alcohol, acetonylacetone, acetylacetone, ethylene glycol monomethyl ether acetate (methyl cellosolve acetate), diethylene glycol monomethyl ether acetate (methyl carbitol acetate), diethylene glycol monoethyl ether acetate (carbitol acetate), ethyl hydroxyisobutyrate, and ethyl lactate can be exemplified, and these water-soluble organic solvents can be used singly or two or more water-soluble organic solvents can be combined together and used.

The content rate of the water-soluble organic solvent in the alkaline solution is preferably 0.1% by mass to 20% by mass and more preferably 1% by mass to 10% by mass.

In addition, the alkaline solution may further contain a water-insoluble organic solvent. As specific examples of the water-insoluble organic solvent, alcohol-based solvents such as n-butanol, 2-butanol, isobutanol, and octanol, aliphatic hydrocarbon-based solvents such as hexane, heptane, and normal paraffin, aromatic hydrocarbon-based solvents such as benzene, toluene, xylene, and alkylbenzene, halogenated hydrocarbon-based solvents such as methylene chloride, 1-chlorobutane, 2-chlorobutane, 3-chlorobutane, and carbon tetrachloride, ester-based solvents such as methyl acetate, ethyl acetate, and butyl acetate, ketone-based solvents such as methyl isobutyl ketone, methyl ethyl ketone, and cyclohexanone, and ether-based solvents such as ethyl ether and butyl ether can be exemplified, and these water-insoluble organic solvents can be used singly or two or more water-insoluble organic solvents can be combined together and used.

In addition, the alkaline solution may further contain a surfactant. Examples of the surfactant include a variety of anionic surfactants, nonionic surfactants, cationic surfactants, amphoteric surfactants, and the like, and, among these, anionic surfactants and nonionic surfactants are preferable.

Examples of the anionic surfactants include alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkyl ether carboxylate, polyoxyethylene alkyl ether sulfate, alkyl phosphate, polyoxyethylene alkyl ether phosphate, and the like, and specific examples thereof include dodecylbenzene sulfonate, isopropylnaphthalene sulfonate, monobutylphenylphenol monosulfonate, monobutylbiphenylsulfonate, dibutylphenylphenol disulfonate, and the like.

Examples of the nonionic surfactants include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkylamine, polyoxyethylene fatty acid amide, fatty acid alkylolamide, alkylalkanolamide, acetylene glycol, oxyethylene adduct of acetylene glycol, polyethylene glycol polypropylene glycol block copolymer, and the like, and, among these, polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, fatty acid alkylolamide, acetylene glycol, oxyethylene adduct of acetylene glycol, polyethylene glycol polypropylene glycol block copolymer are preferable.

As other surfactants, it is also possible to use silicone-based surfactants such as polysiloxane oxyethylene adduct; fluorine-based surfactants such as perfluoroalkyl carboxylate, perfluoroalkyl sulfonates, and oxyethylene perfluoroalkyl ether; biosurfactants such as spicullisporic acid, rhamnolipid, and lysolecithin; and the like.

These surfactants can be used singly or two or more types of surfactants can be mixed together and used. In the case of adding the surfactant, the amount of the surfactant added is preferably 0.001% to 2% by mass, more preferably 0.001% to 1.5% by mass, and still more preferably 0.01% to 1% by mass with respect to the total amount of the alkaline solution.

In a state where the alkaline solution has been heated to 20° C. to 90° C. or ultrasonically vibrated, the layered film, which is the subject, is immersed in the alkaline solution in, for example, a treatment tank. The heating method is not particularly limited, and it is possible to adopt a well-known heating method using heat rays, infrared rays, microwaves, or the like. In addition, for the ultrasonic vibration, it is possible to adopt, for example, a method in which an ultrasonic vibrator is attached to the treatment tank and ultrasonic vibrations are imparted to the alkaline solution, or the like.

In addition, during the immersion, the alkaline solution is preferably under stirring. Examples of the stirring method include a method in which a dispersion liquid of the layered film stored in the treatment tank is mechanically stirred with a stirring blade, a method in which the alkaline solution is stirred with water flows using a water flow pump, a bubbling method with an inert gas such as nitrogen gas or the like, and the like, and these methods may be jointly used in order to efficiently peel a multilayered film.

(Step 1)

The time during which the layered film is immersed in the alkaline solution also depends on the constitution of the layered film, but is typically two minutes to 48 hours in many cases. When the immersion time is shorter than two minutes, there is a concern that an adhesive layer may not completely peel off from the layered film and may partially remain. In the present invention, it is not necessary to peel off the adhesive layer 100% completely from the layered film, and the adhesive may remain in the layered film to a certain extent as long as no inconvenience is caused in a recycling step following the recovery of single-layered films in a step 2 described below. Specifically, it is necessary to peel off 80% by mass or more of the adhesive layer from the layered film.

In the step 1, regarding the number of times of immersion in the alkaline solution, the layered film may be immersed once or several times separately. That is, the step 2 of recovering separated single-layered films that constitute the respective layers of the layered film may be performed after the layered film is immersed once or the step 2 may be performed after the layered film is immersed several times. In addition, in the case of immersing the layered film a plurality of times in the step 1, the concentration of the alkaline solution may be changed. In addition, it is preferable to appropriately add a well-known step such as water washing or drying between the steps.

In many cases, the layered film is provided with, in addition to the adhesive, a printing ink layer in order to indicate a product name or the like or impart decorativeness. Such a printing ink layer can also be peeled off or dissolved in the step of immersing the layered film in the alkaline solution. In addition, there is a case where a metal (aluminum) foil or a deposited film is laminated in the layered film as described above; however, in the present invention, it is also possible to peel off or dissolve such a metal foil or deposited film.

The alkaline solution that is used in the present separation and recovery method is presumed to act on the interface between the layered film and the adhesive or the printing ink to significantly reduce the adhesive force, thereby causing interfacial peeling between the layered film and the adhesive or the printing ink. Typically, there is almost no case where a coating film dissolves in a solution after the crosslinking of a reactive adhesive or the like. However, in the present invention, the morpholine solution is not intended to dissolve the layered film, but causes interfacial peeling, and thus it is presumed that the method is capable of efficiently separating and recovering the layered film within a short period of time.

(Step 2)

In a case where a reactive adhesive is used, the adhesive layer separated from the layered film does not dissolve in the alkaline solution, but remains in the alkaline solution in many cases. That is, in the alkaline solution in step 1, the separated single-layered films that constitute the respective layers of the layered film and the residues of the reactive adhesive, the printing ink, the metal foil, and the like float or dissolve. These substances are removed from the alkaline solution and then classified and recovered.

As an example of a specific method, for example, in a flotation method, plastic having a light specific gravity such as polyolefin such as polypropylene or polyethylene (floating substance), a condensation synthetic film such as polyester or nylon having a heavier specific gravity than polyolefin, and a heavy substance such as a metal foil are sorted, the heavy substance is removed, then, plastic recovered in a washing and dehydrating step is washed and dehydrated, and plastics having different specific gravities are classified by centrifugal separation. For example, the plastic can be classified into a plastic separated substance including a vinyl chloride resin or polyethylene terephthalate having a specific gravity of 1 or more that sinks in water and a plastic separated substance containing an olefin-based resin such as polyethylene or polypropylene that does not contain any vinyl chloride resins.

Additional classification is enabled by changing specific gravities by appropriately changing the mixing ratio of the liquids that are used in floating classification, for example, water and an organic solvent.

Each separated substance is dried, then, solidified, produced as a recycled product, and reused as a recycled raw material for recycled plastic.

(Layered Film)

In the present invention, the film refers to a film obtained by molding a high-molecular-weight component such as a synthetic resin (plastic) into a thin film shape, and the layered film refers to a film including at least one layer of the film and another thin film laminated thereon. The constitution of the layered film is as described below, and examples thereof include a layered film in which two plastic films are laminated through an adhesive, a layered film in which one plastic film and one metal foil are laminated through an adhesive, a layered film in which one plastic film and one sheet of paper are laminated through an adhesive, and the like.

The layered film that is the subject of the present separation and recovery method is not particularly limited and is a layered film laminated and adhered with a reactive adhesive, which is used for food packaging or housewares. However, it is needless to say that a layered film laminated and adhered with a unreactive adhesive, for example, a thermoplastic resin adhesive or a layered film obtained by hot-melting films by an extrusion lamination method can also be separated into individual single-layered films by the separation and recovery method of the present invention. That is, it is a feature of the present invention that a layered film having a variety of types of resin layers discarded by recycling can be treated altogether without any need for particular re-classification.

The layered film that is immersed in the alkaline solution in step 1 may be subjected to the immersion step in a shape that the layered film has after being discarded and recovered for recycling, but the layered film is preferably cut to a certain extent since the layered film can be efficiently separated and recovered.

Moreover, in containers such as PET bottles, a shrink label, which is a layered film formed in a tubular shape, is used in order to indicate a product name or the like or impart decorativeness, and it is common for consumers to peel off the shrink label and separately discard the PET bottle main body and the shrink label during recycling. However, in the separation and recovery method of the present invention, even in a state where a PTE bottle main body and a shrink label are integrated with each other, it is possible to separate the shrink label from the PET bottle main body and to separate the shrink label into individual single-layered films.

In the layered film laminated and adhered with the reactive adhesive, which is the subject of the present separation and recovery method, an adhesive layer made of the reactive adhesive is often laminated between at least two resin film layers or between the resin film and a metal foil or a deposited film layer. Specifically, in the layered film, when the resin film layer is represented by (F), a metal foil layer of the metal foil or the deposited film layer is represented by (M), and the adhesive layer of the reactive adhesive is represented by (AD), the following constitutions can be considered as the specific aspects of the layered film, but it is needless to say that the layered film is not limited thereto.

(F)/(AD)/(F), (F)/(AD)/(F)/(AD)/(F), (F)/(AD)/(M)/(AD)/(F)), (F)/(AD)/(M), (F)/(AD)/(F)/(AD)/(M)/(AD)/(F), (F)/(AD)/(M)/(AD)/(F)/(AD)/(F), (M)/(AD)/(M), (M)/(AD)/(F)/(AD)/(M)), (AD)/(F)/(AD)/(M), (AD)/(F)/(AD)/(F)/(AD), and the like.

There is a case where the layered film, which is the subject of the present separation and recovery method, further has a paper layer, an oxygen absorption layer, an anchor coat layer, a printing layer, or the like.

When classified according to required roles, the resin film layer (F) functions as a substrate film layer (F1), a sealant layer (F2) that serves as a heat-sealing portion at the time of forming a packaging material, and the like.

For example, as a resin film that becomes the substrate film layer (F1), for example, films containing a pigment of a K coat such as polyolefin-based films such as low-density polyethylene, high-density polyethylene, linear low-density polyethylene, biaxially stretched polypropylene (OPP), and non-stretched polypropylene (CPP); polyester-based films such as polyethylene terephthalate (PET) and polybutylene terephthaiate; polyamide-based films such as nylon 6, nylon 6,6, and meta-xylene adipamide (N-MXD6); biodegradable films such as polylactic acid; polyacrylonitrile-based films; poly(meth)acrylic films; polystyrene-based films; polycarbonate-based films; ethylene-vinyl acetate copolymer saponified substance (EVOH)-based films; polyvinyl alcohol-based films; and polyvinylidene chloride can be exemplified. As these films, a transparent deposited film on which alumina, silica, or the like is deposited may also be used.

In addition, there is a case where a variety of surface treatments such as a flame treatment, a corona discharge treatment, and a chemical treatment using a primer is performed on a surface of the film material.

As a flexible polymer film that becomes the sealant layer (F2), a polyolefin-based film such as a polyethylene film, a polypropylene film, or an ethylene-vinyl acetate copolymer, a film of an ionomer resin, an EAA resin, an EMAA resin, an EMA resin, an EMMA resin, a biodegradable resin, or the like is preferable. As generalized names, a non-stretched polypropylene (CPP) film, aluminum-deposited non-stretched polypropylene film (VMCPP), linear low-density polyethylene (LLDPE), low-density polyethylene (LDPE), high-density polyethylene (HDPE), an aluminum deposition-free low density polyethylene film (VMLDPE) film, a film containing these pigments, and the like are exemplified. A variety of surface treatments such as a flame treatment, a corona discharge treatment, and a chemical treatment using a primer may be performed on a surface of the film.

Examples of the metal foil layer (M) include foils of metal having excellent ductility such as gold, silver, copper, zinc, iron, lead, tin, an alloy thereof, steel, stainless steel, or aluminum.

As the paper layer, natural paper, synthetic paper, and the like are exemplified. There is also a case where first and second sealant layers are formed of the same material as the sealant layer.

There is also a case where "other layers" contain well-known additives or stabilizers such as an antistatic agent, an unreactive adhesive layer, an easy-adhesive coating agent, a plasticizer, a lubricant, and an antioxidant.

In the separation and recovery method of the present invention, layered films laminated with a non-reactive adhesive such as an aqueous emulsion are easily recovered, and particularly, the method exhibits the effect for layered films laminated with a reactive adhesive that cannot be skillfully recovered by other well-known separation and recovery methods.

The reactive adhesive is not particularly limited, and it is possible to separate and recover any layered films in which any commercially available reactive adhesive is used. However, the effect can be exhibited particularly for so-called two-liquid type reactive adhesives containing a polyisocyanate composition and a polyol composition or one-liquid type reactive adhesives containing polyisocyanate, and thus the two-liquid type reactive adhesives or the one-liquid type reactive adhesives are preferable.

(Reactive Adhesive: Polyisocyanate Composition)

The polyisocyanate composition that is used in ordinary reactive adhesives is a composition containing a polyisocyanate compound as a main component, and any polyisocyanate compounds can be used without any particular limitations as long as the polyisocyanate compounds are known to be used for reactive adhesives. Examples of specific polyisocyanate compounds include, for example, polyisocyanates having an aromatic structure in the molecular structure such as tolylene diisocyanate, diphenylmethane diisocyanate, polymeric diphenylmethane diisocyanate, 1,5-naphthalene diocyanate, triphenylmethane triisocyanate, and xylylene diisocyanate, compounds in which some of isocyanate groups (NCO groups) of these polyisocyanates are modified with carbodiimide; polyisocyanates having an alicyclic structure in the molecular structure such as isophorone diisocyanates, 4,4'-methylenebis(cyclohexyl isocyanate), and 1,3-(isocyanatomethyl)cyclohexane, linear aliphatic polyisocyanates such as 1,6-hexamethylene diisocyanate, 1,5-pentamethylene diisocyanate, lysine diisocyanate, and trimethylhexamethylene diisocyanate, and compounds in which some of NCO groups of these polyisocyanates are modified with carbodiimide;

isocyanurate bodies of the variety of polyisocyanates; allophanate bodies derived from the variety of polyisocyanates; billet bodies derived from the variety of polyisocyanates; adduct bodies obtained by the trimethylolpropane modification of the variety of polyisocyanates; polyisocyanates that are the reaction products between the variety of polyisocyanates and a polyol component described below; and the like.

(Reactive Adhesive: Polyol Composition)

The polyol composition that is used in ordinary reactive adhesives is a composition containing a polyol compound as a main component, and any polyol compounds can be used without any particular limitations as long as the polyol compounds are known to be used for reactive adhesives. As examples of specific polyol compounds, for example, glycols such as ethylene glycol, propylene glycol, 1,3-propanediol, 1,4-butanediol, 1,5-pentanediol, 3-methyl-1,5-pentanediol, 1,6-hexanediol, neopentyl glycol, methylpentanediol, dimethylbutanediol, butylethylpropanediol, diethylene glycol, triethyleneglycol, tetraethyleneglycol, dipropyleneglycol, tripropylene glycol, bishydroxyethoxybenzene, 1,4-cyclohexanediol, 1,4-cyclohexanedimethanol, and triethylene glycol; trifunctional or tetrafunctional aliphatic alcohols such as glycerin, trimethylolpropane, and pentaerythritol; bisphenols such as bisphenol A, bisphenol F, hydrogenated bisphenol A, and hydrogenated bisphenol F; dimer diols or polymer polyols selected from polyester polyol, polyether polyol, polyurethane polyol, polyether ester polyol, polyester(polyurethane) polyol, polyether(polyurethane) polyol, polyesteramide polyol, acrylic polyol, polycarbonate polyol, polyhydroxyl alkane, castor oil, or mixtures thereof can be exemplified.

Particularly, any of the constitution components of the reactive adhesive preferably has an ester bond since the ester bond is easily dissolved or hydrolyzed with the alkaline solution, and it is possible to easily separate the layered film into single-layered films within a short period of time in the step 1.

Specific examples of a case where "any of the constitution components of the reactive adhesive has an ester bond" include reactive adhesives containing any one or both of a polyol composition having a polyol compound such as polyester polyol, polyether ester polyol, polyester(polyurethane) polyol, or acrylic polyol having an ester bond and a polyisocyanate composition having a polyisocyanate compound that is a reaction product between the polyol compound having an ester bond and the variety of polyisocyanates.

In addition, it is also possible to preferably use reactive adhesives to which, in addition to the polyol composition or the polyisocyanate composition, a resin or low-molecular-weight compound having an acidic group is added. As the resin or low-molecular-weight compound having an acidic group, it is possible to use any resins having an acidic group or low-molecular-weight compounds with no particular limitations as long as the resins or the low-molecular-weight compounds can be easily mixed with the polyol composition or the polyisocyanate composition, which is the main component of the reactive adhesive (in this case, a solvent described below may be used as necessary).

Examples of the resin having an acidic group include resins having an acid value such as a rosin-modified maleic acid resin and a rosin-modified fumaric acid resin; resins that are radical copolymers such as a (meth)acrylic resin, a styrene-(meth)acrylic resin, a styrene-maleic anhydride resin, and a terpene-maleic anhydride resin that are obtained by copolymerizing polymerizable monomers having an acidic group such as a polymerizable monomer having a carboxyl group such as acrylic acid, methacrylic acid, itaconic acid, maleic acid, fumaric acid, cinnamic acid, or an acid anhydride thereof, a polymerizable monomer having a sulfonic acid group such as sulfonated styrene, and a polymerizable monomer having a sulfone amide group such as vinylbenzenesulfonamide; acid-modified polyolefin resins; and the like, and these resins having an acidic group can be used singly or a plurality of the resins can be mixed together and used.

In addition, examples of the low-molecular-weight compound having an acidic group include saturated fatty acids, unsaturated fatty acids, hydroxy acids, aromatic carboxylic acids, dicarboxylic acids, tricarboxylic acids, oxocarboxylic acids, carboxylic acid derivatives, acid anhydrides, and the like, and these low-molecular-weight compounds having an acidic group can be used singly or a plurality of the low-molecular-weight compounds can be mixed together and used.

Examples of the saturated fatty acids include lauric acid, myristic acid, palmitic acid, margaric acid, stearic acid, and the like, and examples of the unsaturated fatty acids include oleic acid, linoleic acid, linolenic acid, arachidonic acid, eicosapentaenoic acid, docosahexaenoic acid, sorbic acid, and the like. Examples of the hydroxy acids include lactic acid, malic acid, citric acid, and the like, and examples of the aromatic carboxylic acids include benzoic acid, phthalic acid, isophthalic acid, terephthalic acid, salicylic acid, gallic acid, mellitic acid, cinnamic acid, and the like. Examples of the dicarboxylic acids include oxalic acid, malonic acid, succinic acid, glutaric acid, adipic acid, fumaric acid, maleic acid, and the like, and examples of the tricarboxylic acids include aconitic acid and the like. Examples of the oxocarboxylic acids include pyruvic acid, oxaloacetic acid, and the like, examples of the carboxylic acid derivatives include amino acid and nitrocarboxylic acid, and examples of the acid anhydrides include trimellitic anhydride, pyromellitic anhydride, and the like. These low-molecular-weight compounds having an acidic group can be used singly or a plurality of the low-molecular-weight compounds can be mixed together and used.

The acid value of the resin or a low-molecular-weight compound having an acidic group is not particularly limited, but is preferably 150 mgKOH/g or more.

At least one of the glass transition point, the softening point, and the melting point of the resin or low-molecular-weight compound having an acidic group is preferably 100° C. or higher.

Additionally, there is a case where, in the reactive adhesive, additives such as a pigment, a silane coupling agent, a coupling agent such as a titanate-based coupling agent or an aluminum-based coupling agent, an adhesion promoter such as an epoxy resin, a leveling agent, inorganic fine particles such as colloidal silica or alumina sol, polymethylmethacrylate-based organic fine particles, an antifoaming agent, an anti-sagging agent, a wet dispersant, a viscosity modifier, an ultraviolet absorber, a metal inactivating agent, a peroxide decomposing agent, a flame retardant, a reinforcing agent, a plasticizer, a lubricant, an anti-rust agent, a fluorescent whitening agent, an inorganic heat-ray absorber, a flame-proofing agent, an antistatic agent, and a dehydrating agent are used.

In addition, as the reactive adhesive, there are an adhesive for dry lamination diluted with a highly soluble organic solvent for dilution, a solvent-free lamination adhesive containing almost no organic solvent for dilution, an aqueous adhesive for which a diluent is water, and the like, and all of the adhesives can be peeled off in the separation and recovery method of the present invention. Specific examples of the highly soluble organic solvent for dilution include toluene, xylene, methylene chloride, tetrahydrofuran, methyl acetate, ethyl acetate, n-butyl acetate, acetone, methyl ethyl ketone (MEK), cyclohexanone, toluol, n-hexane, cyclohexane, and the like. Among these, toluene, xylene, methylene chloride, tetrahydrofuran, methyl acetate, and ethyl acetate are particularly known as the highly soluble organic solvent. For the aqueous adhesive, water or an organic solvent having an affinity to water can be used as a diluting solvent.

In the reactive adhesive, regarding the blending ratio between the polyisocyanate composition and the polyol composition in the two-liquid type reactive adhesive, ordinarily, the equivalent ratio [isocyanate group/hydroxyl group] of an isocyanate group in the polyisocyanate composition to a hydroxyl group in the polyol composition is 1.0 to 5.0 in many cases in terms of the blending ratio that is recommended for commercially available reactive adhesives. It is needless to say that, in some cases, the reactive adhesive is still used with the blending ratio outside the above-described range.

A one-liquid type adhesive, as the reactive adhesive, is used by applying the polyisocyanate composition singly to the film, and the isocyanate groups contained in the polyisocyanate composition react and cross-link as moisture in the air, whereby the one-liquid type adhesive can be used as a laminate adhesive.

In layered films laminated and adhered with the reactive adhesive, the reactive adhesive is, for example, mixed in and then applied to a first plastic film, afterwards, a second plastic film is laminated on the coated surface, and then the reactive adhesive is subjected to an aging step or the like, whereby the reactive adhesive is cured and cross-linked in many cases.

The reactive adhesive preferably contains, particularly, the resin or low-molecular-weight compound having an acidic group. In a two-liquid type reactive adhesive containing a polyisocyanate composition and a polyol composition, the resin or low-molecular-weight compound having an acidic group is preferably blended into the polyol composition from the viewpoint of stability. In addition, the amount of the resin or low-molecular-weight compound having an acidic group added may be appropriately determined within a range where the adhesiveness or curing property of the reactive adhesive is not impaired, but is, approximately, preferably 0.5% to 50% by weight and more preferably 1.0% to 30% by weight with respect to the solid content of the polyol composition.

In addition, when an ester-based adhesive such as an ester-based adhesive, an ester urethane-based adhesive, or an ether ester-based adhesive is used as the reactive adhesive, the ester-based adhesive peels off in the step 1 of immersing the layered film in the alkaline solution while the layered film is heated and stirred at 20° C. to 90° C. or ultrasonically vibrated. On the other hand, for an ether-based adhesive, there is a case where the ether-based adhesive does not easily peel off, and, in such a case, it is preferable to provide a primer layer described below or use an adhesive obtained by adding the resin or low-molecular-weight compound having an acidic group to the ether-based adhesive.

In addition, in the layered film, there is a case where, in addition to the adhesive, a printing ink layer is provided in order to indicate a product name or the like or impart decorativeness. For the printing ink layer, a gravure printing machine, a flexographic printing machine, an offset printing machine, an inkjet printing machine, or the like is used, and an organic solvent-type printing ink, an aqueous or active energy ray-curable ink is printed in many cases. Among these, the ink that is used most often for plastic layered films such as those for food packaging is a gravure ink or a flexographic ink, and, in the present invention, the printing ink layer can also be peeled off as described above.

(Printing Ink)

A typical composition of the printing ink such as the gravure ink or the flexographic ink contains a binder resin, a colorant, a solvent such as an organic solvent or an aqueous solvent, an additive, and the like.

Examples of the binder resin include a cellulose-based resin such as soluble nitrocellulose, an urethane resin, a polyamide resin, a vinyl chloride/vinyl acetate copolymer, a rosin-based resin and a modified substance thereof, a ketone resin, a cellulose-based resin, a polyester resin, a (meth) acrylic resin, and the like, and these binder resins can be appropriately combined together and used. Among these, a cellulose-based resin such as soluble nitrocellulose, an urethane resin, a polyamide resin, a vinyl chloride/vinyl acetate copolymer, and the like are appropriately combined together and used in many cases.

In addition, examples of the colorant include organic and inorganic pigments and dyes that are used for ordinary ink, paint, recording agents, and the like. Examples of the organic pigments include azo-based, phthalocyanine-based, anthraquinone-based, perylene-based, perinone-based, quinacridone-based, thioindigo-based, dioxazine-based, isoindolinone-based, quinophthalone-based, azomethine-azo-based, dictopyrrolopyrrole-based, isoindoline-based, and other pigments, and examples of inorganic pigments include carbon black, titanium oxide, zinc oxide, zinc sulfide, barium sulfate, calcium carbonate, chromium oxide, silica, colcothar, aluminum, mica (isinglass), and the like. In addition, a photoluminescent pigment (METASHINE; Nippon Sheet Glass Co., Ltd.) obtained by coating glass flakes or lump flakes as a base material with metal or metal oxide is exemplified.

As the solvent, examples of the organic solvent include an aromatic organic solvent, a ketone-based solvent such as acetone, methyl ethyl ketone, or methyl isobutyl ketone, an ester-based solvent such as ethyl acetate, n-propyl acetate, butyl acetate, propylene glycol monomethyl ether acetate, and an alcohol-based solvent such as n-propanol, isopropanol, n-butanol, and propylene glycol monomethyl ether. In addition, examples of the aqueous solvent include a solvent containing water as a main component and a water-soluble alcohol-based solvent or the like mixed thereinto.

Examples of the additive include an extender pigment, a pigment dispersant, a leveling agent, an antifoaming agent, a wax, a plasticizer, a blocking inhibitor, an infrared absorber, an ultraviolet absorber, a fragrance, a flame retardant, and the like.

Additionally, there is an ink that is increased in hardness by further adding a crosslinking agent or a chelating agent to cross-link the printing ink layer.

In addition, it is also possible to preferably use printing ink to which the resin or low-molecular-weight compound having an acidic group is added. As the resin or low-molecular-weight compound having an acidic group, any resins or low-molecular-weight compounds can be used with no particular limitations as long as the resins or low-molecular-weight compounds can be easily mixed with the binder resin, the organic solvent, or the like, which is the main component of the printing ink, and have an acid value.

Examples of the resin having an acidic group include resins having an acid value such as a rosin-modified maleic acid resin and a rosin-modified fumaric acid resin; resins that are radical copolymers such as a (meth)acrylic resin, a styrene-(meth)acrylic resin, a styrene-maleic anhydride resin, and a terpene-maleic anhydride resin that are obtained by copolymerizing polymerizable monomers having an acidic group such as a polymerizable monomer having a carboxyl group such as acrylic acid, methacrylic acid, itaconic acid, maleic acid, fumaric acid, cinnamic acid, or an acid anhydride thereof, a polymerizable monomer having a sulfonic acid group such as sulfonated styrene, and a polymerizable monomer having a sulfone amide group such as vinylbenzenesulfonamide; acid-modified polyolefin resins; and the like, and these resins having an acidic group can be used singly or a plurality of the resins can be mixed together and used.

In addition, examples of the low-molecular-weight compound having an acidic group include saturated fatty acids, unsaturated fatty acids, hydroxy acids, aromatic carboxylic acids, dicarboxylic acids, tricarboxylic acids, oxocarboxylic acids, carboxylic acid derivatives, acid anhydrides, and the like, and these low-molecular-weight compounds having an acidic group can be used singly or a plurality of the low-molecular-weight compounds can be mixed together and used.

Examples of the saturated fatty acids include lauric acid, myristic acid, palmitic acid, margaric acid, stearic acid, and the like, and examples of the unsaturated fatty acids include oleic acid, linoleic acid, linolenic acid, arachidonic acid, eicosapentaenoic acid, docosahexaenoic acid, sorbic acid, and the like. Examples of the hydroxy acids include lactic acid, malic acid, citric acid, and the like, and examples of the aromatic carboxylic acids include benzoic acid, phthalic acid, isophthalic acid, terephthalic acid, salicylic acid, gallic acid, mellitic acid, cinnamic acid, and the like. Examples of the dicarboxylic acids include oxalic acid, malonic acid, succinic acid, glutaric acid, adipic acid, fumaric acid, maleic acid, and the like, and examples of the tricarboxylic acids include aconitic acid and the like. Examples of the oxocarboxylic acids include pyruvic acid, oxaloacetic acid, and the like, examples of the carboxylic acid derivatives include amino acid and nitrocarboxylic acid, and examples of the acid anhydrides include trimellitic anhydride, pyromellitic anhydride, and the like. These low-molecular-weight compounds having an acidic group can be used singly or a plurality of the low-molecular-weight compounds can be mixed together and used.

The acid value of the compound having an acidic group is not particularly limited, but is preferably 150 mgKOH/g or more.

At least one of the glass transition point, the softening point, and the melting point of the resin or low-molecular-weight compound having an acidic group is preferably 100° C. or higher.

The printing ink preferably contains, particularly, the resin or low-molecular-weight compound having an acidic group. The amount of the resin or low-molecular-weight compound having an acidic group added may be appropriately determined within a range where the printability of the printing ink is not impaired, but is, approximately, preferably 0.5% to 50% by weight and more preferably 1.0% to 30% by weight with respect to the solid content of the printing ink.

(Primer Layer)

In many cases, the printing ink is printed on a resin film that serves as the substrate film layer (F1) in the layered film, then, the reactive adhesive is applied to the printed surface, and another substrate film (F1), a sealant layer (F2), or a metal foil layer (M) of a metal foil or a deposited film layer is laminated on the reactive adhesive, thereby producing a layered film. In the layered film having this layer constitution, it is also possible and preferable to provide a primer layer on the substrate film layer (F1) that serves as the printed surface. Since the primer layer is easily dissolved or hydrolyzed by the alkaline solution, the primer layer preferably contains a resin having an acidic group, and it becomes possible to easily separate the layered film in which the ink is printed and then the films are laminated with the adhesive into single-layered films that constitute the respective layers of the layered film.

The primer may be provided on the sealant layer (F2) or may be provided on both F1 and F2. When the primers are provided on both F1 and F2, it is possible to more easily separate the layered film into single-layered films.

In the primer layer, it is possible to singly use a resin or low-molecular-weight compound having an acidic group. In addition, it is possible to mix a resin or low-molecular-weight compound having an acidic group with a resin having no acidic group and use the mixture. Examples of the resin having an acidic group include resins having an acid value such as a rosin-modified maleic acid resin and a rosin-modified fumaric acid resin; resins that are radical copolymers such as a (meth)acrylic resin, a styrene-(meth) acrylic resin, a styrene-maleic anhydride resin, and a terpene-maleic anhydride resin that are obtained by copolymerizing polymerizable monomers having an acidic group such as a polymerizable monomer having a carboxyl group such as acrylic acid, methacrylic acid, itaconic acid, maleic acid, fumaric acid, cinnamic acid, or an acid anhydride thereof, a polymerizable monomer having a sulfonic acid group such as sulfonated styrene, and a polymerizable monomer having a sulfone amide group such as vinylbenzenesulfonamide; acid-modified polyolefin resins; and the like, and these resins having an acidic group can be used singly or a plurality of the resins can be mixed together and used.

In addition, in the primer layer, it is also possible to mix one low-molecular-weight compound having an acidic group or a plurality of low-molecular-weight compounds having an acidic group into a resin having a low acid value and capable of forming a film at room temperature and use the mixture.

Examples of the low-molecular-weight compound having an acidic group include saturated fatty acids, unsaturated fatty acids, hydroxy acids, aromatic carboxylicacids, dicarboxylic acids, tricarboxylic acids, oxocarboxylic acids, carboxylic acid derivatives, acid anhydrides, and the like, and these low-molecular-weight compounds having an acidic group can be used singly or a plurality of the low-molecular-weight compounds can be mixed together and used.

Examples of the saturated fatty acids include lauric acid, myristic acid, palmitic acid, margaric acid, stearic acid, and the like, and examples of the unsaturated fatty acids include oleic acid, linoleic acid, linolenic acid, arachidonic acid, eicosapentaenoic acid, docosahexaenoic acid, sorbic acid, and the like. Examples of the hydroxy acids include lactic acid, malic acid, citric acid, and the like, and examples of the aromatic carboxylic acids include benzoic acid, phthalic acid, isophthalic acid, terephthalic acid, salicylic acid, gallic acid, mellitic acid, cinnamic acid, and the like. Examples of the dicarboxylic acids include oxalic acid, malonic acid, succinic acid, glutaric acid, adipic acid, fumaric acid, maleic acid, and the like, and examples of the tricarboxylic acids include aconitic acid and the like. Examples of the oxocarboxylic acids include pyruvic acid, oxaloacetic acid, and the like, examples of the carboxylic acid derivatives include amino acid and nitrocarboxylic acid, and examples of the acid anhydrides include trimellitic anhydride, pyromellitic anhydride, and the like. These low-molecular-weight compounds having an acidic group can be used singly or a plurality of the low-molecular-weight compounds can be mixed together and used.

As the resin capable of forming a film at room temperature, there are a variety of synthetic resins, and examples thereof include a copolymer of polyester, polyvinyl chloride, or vinyl chloride and another unsaturated double bond-containing monomer, a copolymer of a homopolymer of (meth)acrylic acid ester or (meth)acrylic acid ester and another unsaturated double bond-containing monomer, a copolymer of polystyrene or a styrene monomer and another unsaturated double bond-containing monomer, a ketone-formaldehyde condensate or a hydrogenated substance thereof, a polyfunctional epoxy resin, polyvinyl acetal, polyurethane, and the like. These resins capable of forming a film at room temperature can be used singly or one or more selected from the resins capable of forming a film at room temperature can be jointly used. Examples of a polyfunctional epoxy compound include a bisphenol A novolac-type epoxy resin, a bisphenol F novolac-type epoxy resin, a bisphenol S novolac-type epoxy resin, a biphenyl-type epoxy resin, a naphthalene-type epoxy resin, and the like.

In the case of mixing one low-molecular-weight compound having an acidic group or a plurality of low-molecular-weight compounds having an acidic group into the resin having a low acid value and capable of forming a film at room temperature and using the mixture, the amount of the low-molecular-weight compound having an acidic group added may be appropriately determined within a range where the printability or coating aptitude of a primer solution is not impaired, but is, approximately, preferably 0.5% to 50% by weight and more preferably 1.0% to 30% by weight with respect to the solid content of the primer solution.

In a case where an object to be printed is, for example, polypropylene (PP), as the resin capable of forming a film, at least one thermoplastic resin that has favorable adhesion to PP, is selected from the group consisting of a ketone-formaldehyde condensate, a hydrogenated substance thereof, polyester, a vinyl chloride-vinyl acetate copolymer, and polyvinyl acetal, and is solid at 50° C. is preferably used. As such a ketone-formaldehyde condensate or hydrogenated substance thereof, TEGO (registered trademark) VariPlus series (SK, AP, and the like) by Evonik Degussa Japan Co., Ltd. is exemplified, and, as the polyester, VYLON (registered trademark) series (VYLON 200 and the like) manufactured by Toyo Co., Ltd. is exemplified. As the vinyl chloride-vinyl acetate copolymer, SOLBIN (registered trademark) series (SOLBIN AL and the like) manufactured by Nissin Chemical Industry Co., Ltd. is exemplified, and, as the polyvinyl acetal, S-LEC (registered trademark) series (S-LEC KS-10 and the like) manufactured by Sekisui Chemical Co., Ltd. is exemplified.

In order to form the primer layer on a substrate, a solution prepared using each of the components described above is applied to the substrate and dried. The application amount is approximately 0.1 to 5 um (dried thickness). When the application amount is less than 0.1, it is difficult to uniformly apply the solution, and, when the application amount exceeds 5 um, the application is uneconomical and thus impractical. For the application, an ordinary application method, for example, gravure, relief printing plate, flexography, a roll coater, a reverse coater, a spray method, or the like is used. The formation of the primer layer and printing on the primer layer may be continuously (inlinely) performed or the formation of the primer layer and printing may be separately performed.

In the case of performing printing immediately after the application of primer inlinely using a printing machine such as a roll-to-roll printing machine, depending on the re-solubility of a resin that is used in the primer layer in an ink solvent and the glass transition point (Tg) of the resin, so-called blocking, where the printed surface sticks to the rear surface of the substrate, occurs. In order to prevent such blocking, transparent particles having a particle diameter of 0.1 um to 10 um such as silica or titanium oxide are mixed into a primer solvent as a blocking inhibitor in an amount of approximately 0.005% to 5% with respect to the total amount of the primer.

In addition, for the purpose of preventing blocking, the re-solution of a resin solution having a high acid value that is used in the primer in a solvent that is contained in the printing ink may be prevented by neutralizing the resin solution with ammonia or the like in advance before the application of the resin solution.

The acid value of the compound having an acidic group is not particularly limited, but is preferably 150 mgKOH/g or more.

At least one of the glass transition point, the softening point, and the melting point of the compound having an acidic group is preferably 100° C. or higher.

In a case where a white tone-based print design is provided on the layered film in which the primer layer is used, there is a case where a white ink is mainly used in an ink layer, and a film laminated with the adhesive does not easily peel off in an alkaline solution having a low temperature or a low concentration. In that case, the peelability of the ink layer can be further improved by introducing a medium layer that is used for printing ink between the primer layer and a white ink layer or between the white ink layer and the adhesive layer.

In the present invention, in a case where the layered film is a layered film laminated and adhered with the reactive adhesive, the reactive adhesive preferably contains a compound having an acidic group. In addition, in a case where the layered film is a layered film laminated and adhered with the reactive adhesive and has the ink layer and/or the primer layer, at least one layer of the reactive adhesive, the ink layer, and the primer layer preferably contains a compound having an acidic group. When any layer contains a compound having an acidic group, separation and recovery proceed more easily.

As described above, the alkaline solution that is used in the present separation and recovery method is presumed to act on the interface between the layered film and the adhesive or the printing ink to significantly reduce the adhesive force, thereby causing interfacial peeling. Meanwhile, the alkaline solution also has a high solubility and thus dissolves the non-cross-linked printing ink layer. In addition, even in a case where the printing ink layer is cross-linked, since interface peeling is caused in the present invention, it is presumed that the layered film can be efficiently separated and recovered within a short period of time.

EXAMPLES

Hereinafter, the contents and effect of the present invention will be described in more detail using examples. In addition, films, printing inks, reactive adhesives, and organic solvents that were used as raw materials in each of the examples and comparative examples will be described below.

<Films or Foils Used for Layered Films>
OPP: Biaxially stretched polypropylene film 20 um
PET: Polyethylene terephthalate film 12 um
OPA: Polyamide (nylon) film 15 um
CPP: Non-stretched polypropylene film 35 um
LLDPE: Non-stretched linear low-density polyethylene film 60 um
VMCPP: Aluminum-deposited non-stretched polypropylene film 25 um
AL: Aluminum foil 9 um
<Solutions Containing Compound Having Acidic Group (Acidic Solution)>
Ac1: A solution obtained by diluting MALKYD #31 (a maleinized rosin resin having an acid value of 200 mgKOH/g) manufactured by Arakawa Chemical Industries, Ltd. with ethyl acetate to 40% by mass was regarded as Ac1.

Ac2: A solution obtained by diluting MALKYD #32 (a maleinized rosin resin having an acid value of 140 mgKOH/g) manufactured by Arakawa Chemical Industries, Ltd. with ethyl acetate to 40% by mass was regarded as Ac2.

Ac3: A solution obtained by diluting SMA1000 (a styrene-maleic anhydride copolymer having an acid value of 480 mgKOH/g) manufactured by Clay Valley with ethyl acetate to 40% by mass was regarded as Ac3.

Ac4: A solution obtained by diluting citric acid (having an acid value of 876 mgKOH/g) with acetone to 20% by mass was regarded as Ac4.

Ac5: A solution obtained by diluting pyromellitic anhydride (having an acid value of 1030 mgKOH/g) with acetone to 20% by mass was regarded as Ac5.

<Printing Inks>
(Solvent-Type Back Printing Gravure Inks)
Ink1: FINART R507 primary color indigo manufactured by DIC Graphics Corporation
Ink2: FINART R794 white S manufactured by DIC Graphics Corporation
(Aqueous Back Printing Flexographic Ink)
Ink3: MARINEFLEX LM R507 primary color indigo manufactured by DIC Graphics Corporation
(Printing Inks Containing Compound Having Acidic Group)
Ink4: An ink obtained by blending Ac1 into Ink1 such that the compound having an acidic group reached 5% by mass in the solid content was regarded as Ink4.
Ink5: An ink obtained by blending Ac3 into Ink1 such that the compound having an acidic group reached 1% by mass in the solid content was regarded as Ink5.
Ink6: An ink obtained by blending Ac1 into Ink1 such that the compound having an acidic group reached 1% by mass in the solid content was regarded as Ink6.

<Reactive Adhesives>
(Two-Liquid Solvent-Type Adhesives)
Two-liquid solvent-type adhesive (ester urethane-based adhesive) of DICDRY LX-815 and KW-75 manufactured by DIC India Ltd.
Two-liquid solvent-type adhesive (ether-based adhesive) of DICDRY LX-401A and SP-60
(Two-Liquid Solvent-Free Adhesives)
Two-liquid solvent-free adhesive (ester-based adhesive) of DICDRY 2K-SF-400A and HA-400B manufactured by DIC Graphics Corporation
Two-liquid solvent-free adhesive (ester-based adhesive) of PASLIM NS601A and NS601B manufactured by DIC Graphics Corporation
Two-liquid solvent-free adhesive (ester ether-based adhesive) of SunLam NS-2100A and HA-450B manufactured by Sun Chemical Company Ltd.
(Reactive Adhesive Containing Compound Having Acidic Group)
Two-liquid solvent-free adhesive (ester urethane-based adhesive) of Po-1 and KW-75 obtained by blending Ac1 to DICDRY LX-815 manufactured by DIC India Ltd. such that the compound having an acidic group reached 5% by mass in the solid content
Two-liquid solvent-free adhesive (ester urethane-based adhesive) of Po-2 and KW-75 obtained by blending Ac2 to DICDRY LX-815 manufactured by DIC India Ltd. such that the compound having an acidic group reached 5% by mass in the solid content
Two-liquid solvent-free adhesive (ester-based adhesive) of Po-3 and 2K-SF-400A obtained by blending Ac1 to DICDRY HA-400B manufactured by DIC Graphic Corporation such that the compound having an acidic group reached 5% by mass in the solid content
Two-liquid solvent-free adhesive (ester-based adhesive) of Po-4 and 2K-SF-400A obtained by blending Ac3 to DICDRY HA-400B manufactured by DIC Graphic Corporation such that the compound having an acidic group reached 2% by mass in the solid content
Two-liquid solvent-free adhesive (ester-based adhesive) of Po-5 and 2K-SF-400A obtained by blending Ac4 to DICDRY HA-400B manufactured by DIC Graphic Corporation such that the compound having an acidic group reached 5% by mass in the solid content
Two-liquid solvent-free adhesive (ester-based adhesive) of Po-6 and 2K-SF-400A obtained by blending Ac5 to DICDRY HA-400B manufactured by DIC Graphic Corporation such that a compound having an acidic group reached 5% by mass in the solid content
Two-liquid solvent-free adhesive (ester ether-based adhesive) of Po-7 and NS-2100A obtained by blending Ac4 to SunLam HA-450B manufactured by Sun Chemical Company Ltd. such that a compound having an acidic group reached 5% by mass in the solid content The compositions of the adhesives are shown in Table 1.

TABLE 1

Blending table of reactive adhesive

| Product name of reactive adhesive | Polyol | | | | Polyisocyanate | |
|---|---|---|---|---|---|---|
| | Name of mixture of polyol and acid compound | Polyol (product name) | Acid compound | Acid compound in solid content % | Polyisocyanate (product name) | Type |
| DICDRY manufactured by DIC India Ltd. | | LX-815 | — | — | KW-75 | Ester urethane-based adhesive |
| DICDRY manufactured by DIC Graphic Corporation | | LX-401A | — | — | SP-60 | Ether-based adhesive |
| DICDRY manufactured by DIC Graphic Corporation | | HA-400B | — | — | 2K-SF-400A | Ester-based adhesive |
| PASLIM manufactured by DIC Graphic Corporation | | NS601B | — | — | NS601A | Ester-based adhesive |

TABLE 1-continued

Blending table of reactive adhesive

| Product name of reactive adhesive | Polyol | | | | Polyisocyanate | |
|---|---|---|---|---|---|---|
| | Name of mixture of polyol and acid compound | Polyol (product name) | Acid compound | Acid compound in solid content % | Polyisocyanate (product name) | Type |
| SunLam manufactured by Sun Chemical Company Ltd. | | HA-450B | — | — | NS-2100A | Ether ester-based adhesive |
| | Po-1 | LX-815 | Ac1 | 5% by mass | KW-75 | Ester urethane-based adhesive |
| | Po-2: | LX-815 | Ac2 | 5% by mass | KW-75 | Ester urethane-based adhesive |
| | Po-3 | HA-400B | Ac1 | 5% by mass | 2K-SF-400A | Ester-based adhesive |
| | Po-4 | HA-400B | Ac3 | 2% by mass | 2K-SF-400A | Ester-based adhesive |
| | Po-5 | HA-400B | Ac4 | 5% by mass | 2K-SF-400A | Ester-based adhesive |
| | Po-6 | HA-400B | Ac5 | 5% by mass | 2K-SF-400A | Ester-based adhesive |
| | Po-7 | HA-450B | Ac4 | 5% by mass | NS-2100A | Ether ester-based adhesive |

<Primers>

Pr1: A primer solution obtained by diluting MALKYD #31 (a maleinized rosin resin having an acid value of 200 mgKOH/g) manufactured by Arakawa Chemical Industries, Ltd. with ethyl acetate to 20% by mass was regarded as Pr1.

Pr2: A primer solution obtained by diluting JONCRYL 690 (a styrene acrylic acid resin having an acid value of 240 mgKOH/g) manufactured by BASF with ethyl acetate to 20% by mass was regarded as Pr2.

Pr3: A primer solution obtained by diluting JONCRYL HPD-96J (a styrene acrylic acid resin having an acid value of 240 mgKOH/g neutralized with ammonia water) manufactured by BASF with water to 20% by mass was regarded as Pr3.

Pr4: A primer solution obtained by blending citric acid into VYLON 200 (a polyester resin having an acid value of 0 mgKOH/g) manufactured by Toyo Co., Ltd. such that the weight ratio reached 5:1 and then diluting the solution with MEK to 20% by mass was regarded as Pr4.

Pr5: A primer solution obtained by blending pyromellitic anhydride into VYLON 200 (a polyester resin having an acid value of 0 mgKOH/g) manufactured by Toyo Co., Ltd. such that the weight ratio reached 5:1 and then diluting the solution with MEK to 20% by mass was regarded as Pr5.

<Alkaline Solutions>

Aqueous solutions of sodium hydroxide "SH solution": 1% by mass, 5% by mass, and 10% by mass aqueous solution were prepared by dissolving sodium hydroxide (reagent, first grade) manufactured by Wako Pure Chemical Industries, Ltd. in ion-exchanged water. The aqueous solutions were represented by SH1, SH2, and SH3, respectively.

<Method for Producing Layered Films>

Layered films were produced by performing printing on target films by a printing method and then laminating the target films together by a laminating method. The layer constitutions of the films, the reactive adhesives, and the types of the printing inks were determined according to the combinations in Table 1.

<Printing Method>

Each of the gravure inks and the flexographic ink, which were the printing inks, was spread on a film "Film1" using a proofer.

<Laminating Method>

A reactive adhesive "Ad" was applied with a laminator to the surface of the film "Film1" on which the printing ink had been spread or the surface opposite to the printing ink-spread surface such that the amount of a coating film reached 3 g/m² in terms of the solid content, and the film "Film 1" was laminated with a film "Film2". In addition, a layered film in which the primer "Pr1" was combined was also produced. The film thicknesses of the primers are shown in the table.

An aging reaction was caused in the laminated layered film at 40° C. for 72 hours. In the case of a three-layer constitution, the steps were repeated to obtain layered films "LAM1" to "LAM25" shown in Table 2.

The blending ratios (X/Y) between the polyol and the polyisocyanate in the reactive adhesives "Ad" used represent the weight ratios between the solid contents and are as described below.

Ad1: Po-1/KW-75=6/1

Ad2: Po-2/KW-75=6/1

Ad3: 2K-SF-400A/Po-3=100/50

Ad4: 2K-SF-400A/Po-4=100/50

Ad5: LX-815/KW-75=6/1

Ad6: 2K-SF-400A/HA-400B=100/50

Ad7: NS-601A/NS-601B=100/50

Ad8: LX-401A/SP-60=1/1

Ad9: 2K-SF-400A/Po-5=100/50

Ad10: 2K-SF-400A/Po-6=100/50

Ad11: NS-2100A/HA-450B=100/4

Ad12: NS-2100A/Po-7=100/4

TABLE 2

Configuration of layered film

Outer surface side ←

| | | Pr1 film thickness | | | | → inner surface side | | |
|---|---|---|---|---|---|---|---|---|
| | Film1 | 0.5 um | Ink | Ad | Film2 | Ad | Pr2 | Film3 |
| LAM1 | PET | | Ink4 | Ad1 | VMCPP | | | |
| LAM2 | PET | | Ink4 | Ad2 | VMCPP | | | |
| LAM3 | PET | | Ink4 | Ad3 | VMCPP | | | |
| LAM4 | OPP | | Ink4 | Ad4 | VMCPP | | | |
| LAM5 | OPP | | Ink5 | Ad3 | CPP | | | |
| LAM6 | OPP | | Ink6 | Ad4 | CPP | | | |
| LAM7 | OPP | | Ink3 | Ad3 | CPP | | | |
| LAM8 | PET | Pr1 | Ink3 | Ad3 | OPA | Ad3 | | LLDPE |
| LAM9 | OPP | Pr1 | Ink1 | Ad3 | CPP | | | |
| LAM10 | OPP | Pr1 | Ink1 | Ad4 | CPP | | | |
| LAM11 | OPP | Pr1 | Ink1 | Ad5 | CPP | | | |
| LAM12 | OPP | Pr1 | Ink1 | Ad7 | CPP | | | |
| LAM13 | OPP | Pr1 | Ink2 | Ad3 | CPP | | | |
| LAM14 | OPP | | Ink1 | Ad6 | CPP | | | |
| LAM15 | OPP | | Ink1 | Ad8 | CPP | | | |
| LAM16 | OPP | Pr1 | Ink1 | Ad8 | CPP | | | |
| LAM17 | OPP | Pr2 | Ink1 | Ad6 | CPP | | | |
| LAM18 | OPP | Pr3 | Ink1 | Ad6 | CPP | | | |
| LAM19 | OPP | Pr4 | Ink1 | Ad6 | CPP | | | |
| LAM20 | OPP | Pr5 | Ink1 | Ad6 | CPP | | | |
| LAM21 | OPP | Pr1 | Ink1 | Ad9 | CPP | | | |
| LAM22 | OPP | Pr1 | Ink1 | Ad10 | CPP | | | |
| LAM23 | OPP | Pr1 | Ink1 | Ad6 | | | Pr1 | CPP |
| LAM24 | OPP | Pr1 | Ink1 | Ad11 | CPP | | | |
| LAM25 | OPP | Pr1 | Ink1 | Ad12 | CPP | | | |

TABLE 3

Configuration of layered film

Outer surface side ←

| | | Pr1 film | | | → inner surface side | | | |
|---|---|---|---|---|---|---|---|---|
| | Film1 | thickness | Ink | Ad | Film2 | Ad | Pr2 | Film3 |
| LAM16-2 | OPP | Pr1 | Ink1 | Ad8 | CPP | | | |

*In the table, "outer surface side" refers to a surface of the layered film opposite to a surface that comes into contact with a content when the layered film is used as a packaging body (a surface that is on the outermost side during the distribution of the product), and "inner surface side" refers to the surface that comes into contact with the content when the layered film is used as the packaging body.

EXAMPLES (Method for Separating and Recovering Layered Film 1, Step 1)

In a separation and recovery method 1, the stirring treatment time in each step was set to two hours, and evaluation was performed. Peeling after two hours of the stirring treatment indicates that the layered films had significantly favorable performance.

The layered films "LAM1" to "LAM25" were cut into sizes of 10 mm×10 mm to obtain test pieces. A peeling test was performed on these test pieces through Step 1-1 to Step 1-7.

Step 1-1: A stirring treatment on the SH2 solution at 30° C. for two hours

Step 1-2: A stirring treatment on the SH2 solution at 60° C. for two hours

Step 1-3: A stirring treatment on the SH2 solution at 90° C. for two hours

Step 1-4: A stirring treatment on the SH1 solution at 60° C. for two hours

Step 1-5: A stirring treatment on the SH3 solution at 60° C. for two hours

Step 1-6: A stirring treatment on ethyl acetate (manufactured by Kanto Kagaku, Cica first grade) at 50° C. for two hours Step 1-7: A stirring treatment on tetrahydrofuran (manufactured by Kanto Kagaku, Cica first grade) at 40° C. for two hours (Method for Separating and Recovering Layered Film 1, Step 2)

After the step 1, the films were separated from the liquid by a filtration method, removed, washed with water, and then dried at 50° C. After that, the peeling states of the films were observed. For the multilayered films including the aluminum-deposited film, the remaining of an aluminum atom in the films was confirmed with fluorescent X-rays on the peeled surfaces.

(Method for Separating and Recovering Layered Film 2, Step 1)

In a separation and recovery method 2, the stirring treatment time in each step was set to five hours, and evaluation was performed. Peeling after five hours of the stirring treatment indicates that the layered films are practically acceptable.

The layered films "LAM1" to "LAM25" were cut into sizes of 10 mm×10 mm to obtain test pieces. A peeling test was performed on these test pieces in Step 2-2.

Step 2-2: A stirring treatment on the SH2 solution at 60° C. for five hours (Method for Separating and Recovering Layered Film 2, Step 2)

After the step 1, the films were separated from the liquid by a filtration method, removed, washed with water, and then dried at 50° C. After that, the peeling states of the films were observed. For the multilayered films including the aluminum-deposited film, the remaining of an aluminum atom in the films was confirmed with fluorescent X-rays on the peeled surfaces.

The results are shown in the tables.

(Results of Separation and Recovery Method 1)

In the examples, the alkaline solutions containing 1% by mass or more of sodium hydroxide that were used in Step 1-1 to Step 1-5 of the separation and recovery method 1 were capable of peeling all of the layered films into single-layered films that constitute the respective layers of the layered films. In addition, no ink layer remained on the single-layered films. On the other hand, under a condition of two hours of the stirring treatment, it was difficult to isolate the ink layer and the adhesive layer from the multilayered film made up of the ink and the adhesive which contained no acidic group.

In addition, in the examples, even under the condition of two hours of the stirring treatment, in a case where the primer having an acidic group was present between the film and the ink layer, it was possible to easily peel off the layered films in the alkaline solution with no compound having an acidic group in the ink layer or the adhesive layer.

Meanwhile, under this condition, in the layered films in which the ether-based adhesive was used, it was difficult to isolate the ink layer or the adhesive layer from the film even when the primer containing an acidic group was used.

Example 18, LAM16

In addition, in the examples where the layered film having the aluminum-deposited layer was used, it was possible to observe that the aluminum-deposited layer disappeared from the film, and it was not possible to confirm an aluminum atom in the film even from the results of element analyses.

In the case of using ethyl acetate in the step 1-6, which is a comparative example, it was not possible to confirm the peeling of the film after two hours of the stirring treatment. In addition, in the case of using tetrahydrofuran in the step 1-7, polyethylene terephthalate (PET) and the aluminum-deposited non-stretched polypropylene film (VMCPP) peeled off after two hours of the stirring treatment, and it was confirmed that an aluminum atom remained on the CPP film from the results of the element analyses.

(Results of Separation and Recovery Method 2)

LAM16 that did not peel off in the separation and recovery method 1 in Example 18 was observed to peel off in the separation and recovery method 2 (refer to Example 22). On the other hand, it was not possible to completely peel off LAM14 and LAM15 that did not have an acid component in the layer constitution even in the separation and recovery method 2.

TABLE 4

|  | Example 1 | Example 2 | Example 3 | Example 4 | Example 5 | Example 6 | Example 7 | Example 8 |
|---|---|---|---|---|---|---|---|---|
| Multilayer film | LAM1 | LAM2 | LAM3 | LAM4 | LAM5 | LAM6 | LAM7 | LAM8 |
| Step 1-1 |  |  |  |  |  |  |  |  |
| Step 1-2 | Peeled*1 | Peeled*1 | Peeled*1 | Peeled*1 | Peeled | Peeled | Peeled | Peeled |
| Step 1-3 |  |  |  |  |  |  |  |  |
| Step 1-4 |  |  |  |  |  |  |  |  |
| Step 1-5 |  |  |  |  |  |  |  |  |
| Step 1-6 |  |  |  |  |  |  |  |  |
| Step 1-7 |  |  |  |  |  |  |  |  |
| Step 2-2 |  |  |  |  |  |  |  |  |

*1 No aluminum-deposited layer
* 2 Aluminum-deposited layer remains

TABLE 5

|  | Example 9 | Example 10 | Example 11 | Example 12 | Example 13 | Example 14 | Example 15 | Example 16 |
|---|---|---|---|---|---|---|---|---|
| Multilayer film | LAM9 | LAM10 | LAM11 | LAM12 | LAM13 | LAM1 | LAM1 | LAM1 |
| Step 1-1 |  |  |  |  |  | Peeled*1 |  |  |
| Step 1-2 | Peeled | Peeled | Peeled | Peeled | Peeled |  |  |  |
| Step 1-3 |  |  |  |  |  |  | Peeled*1 |  |
| Step 1-4 |  |  |  |  |  |  |  | Peeled*1 |
| Step 1-5 |  |  |  |  |  |  |  |  |
| Step 1-6 |  |  |  |  |  |  |  |  |
| Step 1-7 |  |  |  |  |  |  |  |  |
| Step 2-2 |  |  |  |  |  |  |  |  |

*1 No aluminum-deposited layer
* 2 Aluminum-deposited layer remains

TABLE 6

|  | Example 17 | Example 18 | Example 19 | Example 20 | Example 21 | Example 22 | Example 23 |
|---|---|---|---|---|---|---|---|
| Multilayer film | LAM1 | LAM16 | LAM17 | LAM18 | LAM19 | LAM16 | LAM16-2 |
| Step 1-1 |  |  |  |  |  |  |  |
| Step 1-2 |  | Not peeled | Peeled | Peeled | Peeled |  | Peeled |
| Step 1-3 |  |  |  |  |  |  |  |
| Step 1-4 |  |  |  |  |  |  |  |
| Step 1-5 | Peeled*1 |  |  |  |  |  |  |
| Step 1-6 |  |  |  |  |  |  |  |
| Step 1-7 |  |  |  |  |  |  |  |
| Step 2-2 |  |  |  |  |  | Peeled |  |

*1 No aluminum-deposited layer
* 2 Aluminum-deposited layer remains

TABLE 7

|  | Example 24 | Example 25 | Example 26 | Example 27 | Example 28 |
| --- | --- | --- | --- | --- | --- |
| Multilayer film | LAM20 | LAM22 | LAM23 | LAM24 | LAM25 |
| Step 1-1 | | | | | |
| Step 1-2 | Peeled | Peeled | Peeled | Peeled | Peeled |
| Step 1-3 | | | | | |
| Step 1-4 | | | | | |
| Step 1-5 | | | | | |
| Step 1-6 | | | | | |
| Step 1-7 | | | | | |
| Step 2-2 | | | | | |

\* 1 No aluminum-deposited layer
\* 2 Aluminum-deposited layer remains

TABLE 8

|  | Comparative Example 1 | Comparative Example 2 | Comparative Example 3 | Comparative Example 4 | Comparative Example 5 | Comparative Example 6 |
| --- | --- | --- | --- | --- | --- | --- |
| Multilayer film | LAM14 | LAM15 | LAM14 | LAM15 | LAM1 | LAM1 |
| Step 1-1 | | | | | | |
| Step 1-2 | Not peeled | Not peeled | | | | |
| Step 1-3 | | | | | | |
| Step 1-4 | | | | | | |
| Step 1-5 | | | | | | |
| Step 1-6 | | | | | Not peeled | |
| Step 1-7 | | | | | | Peeled*2 |
| Step 2-2 | | | Not peeled | Not peeled | | |

*2 Aluminum-deposited layer remains

The invention claimed is:

1. A method for recovering resin films from a laminate, the method comprising:
a step 1 of immersing the laminate in an alkaline solution while stirring the laminate with heating at 20° C. to 90° C. or ultrasonically vibrating the laminate to separate the resin films from the laminate; and
a step 2 of recovering the resin films,
wherein the laminate comprises:
a first resin film layer (i) of a first resin film,
an adhesive layer (ii) of a reactive adhesive comprising an ester bond,
at least one layer (iii) selected from the group consisting of a printing ink layer and a primer layer, wherein said at least one layer (iii) contains a compound having a carboxyl group or an anhydride of the compound, wherein the compound or the anhydride of the compound is selected from the group consisting of saturated fatty acids, unsaturated fatty acids, hydroxy acids, aromatic carboxylic acids, dicarboxylic acids, tricarboxylic acids, oxocarboxylic acids, carboxylic acid derivatives, a maleinized rosin resin, and acid anhydrides thereof,
at least one of a second resin film layer (iv) of a second resin film, and a third layer (v) selected from the group consisting of a metal foil and a deposited film layer,
wherein the adhesive layer (ii) and said at least one layer (iii) are provided between the first resin film layer (i) and the second resin film layer (iv), or between the first resin film layer (i) and the third layer (v).

2. The method according to claim 1,
wherein the reactive adhesive is a reactive adhesive containing a polyisocyanate composition and a polyol composition.

3. The method according to claim 1,
wherein the reactive adhesive is a reactive adhesive containing a polyisocyanate composition, a polyol composition, and a compound having an acidic group.

\* \* \* \* \*